United States Patent
Caspi

(10) Patent No.: US 10,000,008 B2
(45) Date of Patent: Jun. 19, 2018

(54) BRACELET MOLD AND METHOD OF USE

(71) Applicant: Alex Toys, LLC, Northvale, NJ (US)

(72) Inventor: Liah Caspi, Closter, NJ (US)

(73) Assignee: Alex Toys, LLC, Northvale, NJ (US)

( * ) Notice: Subject to any disclaimer, the term of this patent is extended or adjusted under 35 U.S.C. 154(b) by 725 days.

(21) Appl. No.: 14/556,557

(22) Filed: Dec. 1, 2014

(65) Prior Publication Data

US 2016/0151962 A1 Jun. 2, 2016

(51) Int. Cl.

| | |
|---|---|
| *B29C 61/02* | (2006.01) |
| *B29C 33/40* | (2006.01) |
| *B29C 33/42* | (2006.01) |
| *A44C 5/00* | (2006.01) |
| *B29K 25/00* | (2006.01) |
| *B29K 105/00* | (2006.01) |
| *B29L 31/00* | (2006.01) |
| *B29K 105/02* | (2006.01) |
| *A44C 27/00* | (2006.01) |

(52) U.S. Cl.
CPC .......... *B29C 61/025* (2013.01); *B29C 33/405* (2013.01); *B29C 33/42* (2013.01); *B29C 61/02* (2013.01); *A44C 5/0053* (2013.01); *A44C 27/008* (2013.01); *B29K 2025/06* (2013.01); *B29K 2105/02* (2013.01); *B29K 2105/256* (2013.01); *B29L 2031/743* (2013.01)

(58) Field of Classification Search
CPC ..... A44C 5/0053; A44C 5/0069; A44C 27/00; A44C 27/008; B29C 61/02; B29C 61/025
USPC .......................................... 264/342 R; 249/59
See application file for complete search history.

(56) References Cited

U.S. PATENT DOCUMENTS

| | | |
|---|---|---|
| 118,169 A | 8/1871 | Tinsley et al. |
| 433,879 A | 8/1890 | Sullivan |
| 746,944 A | 12/1903 | Ford |
| 3,406,430 A | 10/1968 | Furstenburg et al. |
| 4,013,259 A | 3/1977 | Tryon |
| 4,102,456 A | 7/1978 | Morris |
| 4,218,420 A | 8/1980 | Jacob et al. |
| 5,718,278 A | 2/1998 | Baum |
| 5,916,271 A | 6/1999 | Baum |
| 5,979,537 A | 11/1999 | Baum |
| 6,032,719 A | 3/2000 | Baum |
| 6,123,141 A | 9/2000 | Baum |
| 6,157,865 A | 12/2000 | Cromett |
| 6,299,818 B1 | 10/2001 | Hakinson |
| 6,435,255 B1 | 8/2002 | Kaladjian |
| 6,470,571 B1 | 10/2002 | Namiki |
| 7,409,763 B2 | 8/2008 | Pratt |

(Continued)

OTHER PUBLICATIONS

Ink Stains: Stamped Shrink Plastic/Shrinky Dink Rings. inkstainswithroni.blogspot.com/2009/05/stamped-shrink-plastic-shrinky-dink.html. pp. 1-10. Published May 16, 2009. Accessed online Aug. 4, 2017.*

(Continued)

*Primary Examiner* — Atul P. Khare
(74) *Attorney, Agent, or Firm* — Howson & Howson L.L.P.

(57) ABSTRACT

A decorated strip of coated, heat-shrinkable, plastic sheet material is placed in a spiral slot formed in a silicone rubber mold. The spiral slot is defined by a spiral wall having a uniform wall thickness. Upon heating in an oven, the material shrinks, forming a resiliently expansible arc-shaped band that can be worn as a bracelet or wristband.

11 Claims, 2 Drawing Sheets

(56) References Cited

U.S. PATENT DOCUMENTS

2007/0278711 A1 12/2007 Levi
2008/0022718 A1 1/2008 Pratt
2010/0263408 A1 10/2010 Kim

OTHER PUBLICATIONS

The 1 Trick You Need to Know about Shrinky Dinks! flameshadow117.deviantart.com/journal/The-1-Trick-You-Need-to-Know-About-Shrinky-Dinks-450355200. pp. 1-2. Published Apr. 26, 2014. Accessed online Aug. 4, 2017.*
Shrinky Dinks Bake & Shape 3D Jewelry. Alex Brands. pp. 1-2. Published 2014. Accessed Aug. 4, 2017 online at https://www.alexbrands.com/product/arts-crafts/shrinky-dinks-bake-shape-3d-jewelry-2/.*
Shrinky Dink Rings. https://diannefaw.wordpress.com/2011/06/05/day-5-shrinky-dink-rings/. pp. 1-3. Published Jun. 5, 2011. Accessed online Aug. 4, 2017.*
How to Make Shrinky Dinks with Recycled #6 Plastic. https://www.skiptomylou.org/how-to-make-shrinky-dinks-with-recycled-6-plastic/. pp. 1-5. Published Jan. 7, 2009. Accessed online Aug. 4, 2017.*
Shrink Plastic Ring Tutorial. https://www.planetjune.com/blog/shrink-plastic-ring-tutorial/. pp. 1-7. Published Feb. 23, 2008. Accessed online Aug. 4, 2017.*

* cited by examiner

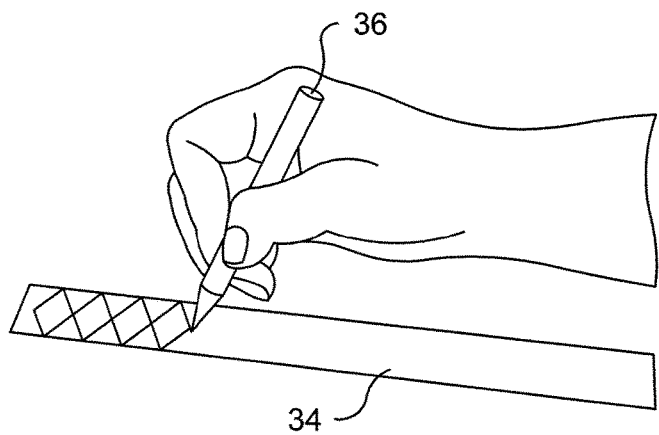
*Fig. 3*
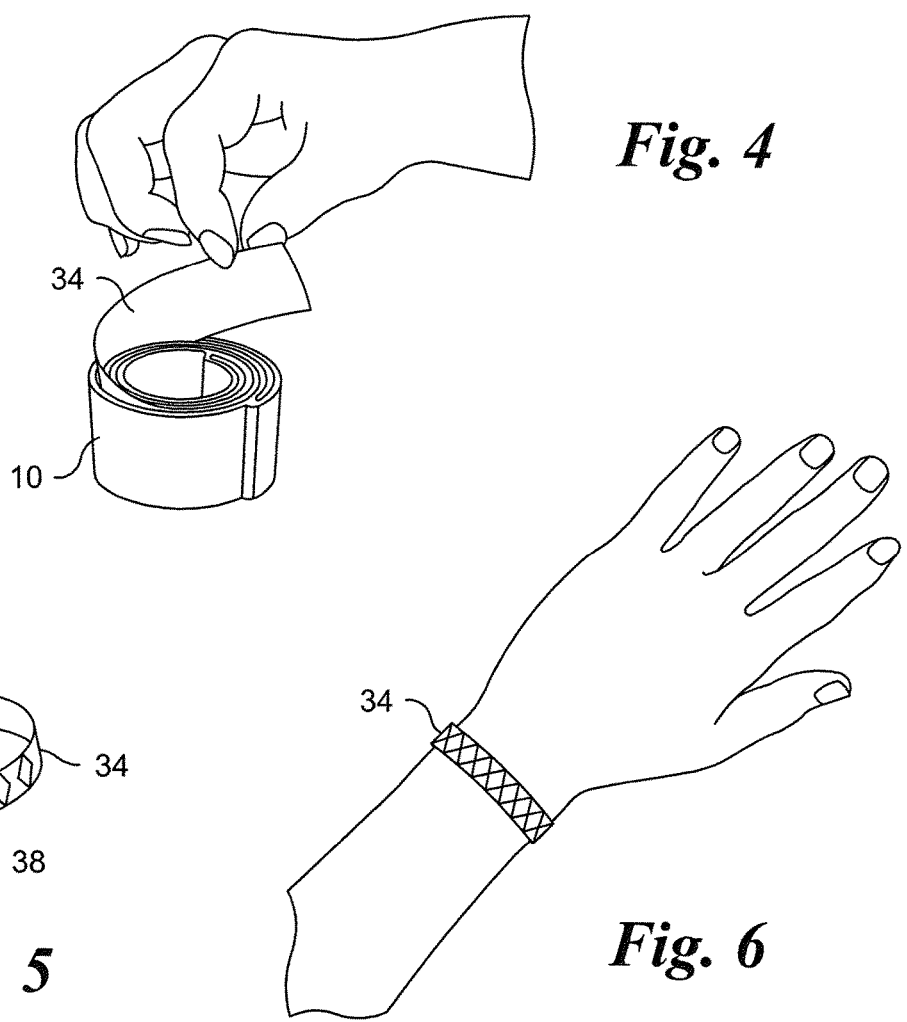
*Fig. 4*
*Fig. 5*
*Fig. 6*

BRACELET MOLD AND METHOD OF USE

FIELD OF THE INVENTION

This invention relates to hobby crafts, and particularly to a bracelet mold and to the use of the mold to produce a bracelet from a decorated strip of coated, heat-shrinkable, polystyrene film.

BACKGROUND OF THE INVENTION

For about forty years, a popular hobby craft activity for both children and adults has been the production of three-dimensional objects from a heat-shrinkable sheet material known by the trademark SHRINKY DINKS, a registered trademark of K & B Innovations, Inc. The material consists of a sheet of thin plastic material that can be colored and/or cut out, and then heated to cause it to shrink and form thickened and hardened art forms. Typically the plastic sheet material is composed of a heat-shrinkable polystyrene base material coated with a water-insoluble, ink-receptive coating. The sheet material and some of its uses are described in U.S. Pat. No. 4,102,456, granted Jul. 25, 1978, and U.S. Pat. No. 6,157,865, granted Dec. 5, 2000. Coatings for the base material are described in U.S. Pat. No. 3,889,270 granted Jun. 10, 1975, U.S. Pat. No. 4,503,111 granted Mar. 5, 1985, U.S. Pat. No. 4,555,437 granted Nov. 26, 1985, U.S. Pat. No. 5,190,805 granted Mar. 2, 1993 and U.S. Pat. No. 5,206,071, granted Apr. 27, 1993. The disclosures of all of the aforementioned United States patents are incorporated by reference.

As supplied, the plastic sheet material is usually flat, and accordingly to form a wristband, bracelet, or the like, from a decorated strip of such material, it would be necessary to provide for a connection of one end of the strip to the other end. Heating the strip will cause it to curl, but, because shrinkage takes place unevenly, the result is usually not aesthetically acceptable.

There has been a need for a simple, convenient, and reliable way to utilize SHRINKY DINK sheet material to produce wearable jewelry in the nature wrist bands, bracelets and the like.

SUMMARY OF THE INVENTION

The mold in accordance with the invention comprises a block of silicone rubber having a bottom side and a top side parallel to the bottom side. A spiral slot is formed in said block, and open at the top side of the block and closed at the bottom side of the block. The spiral slot extends by at least two full turns, i.e., through an angle of at least 720°, and preferably 810°, around an axis that is in perpendicular relation to the top and bottom sides of the block A cover, preferably also made of silicone rubber, fits removably over the top side of said block, for enclosing the spiral slot.

Preferably, each of the bottom and top sides of the silicone rubber block has a central opening, and the central opening in the bottom side is connected to the central opening in the top side by a through passage. The spiral slot is preferably bounded by walls having a uniform thickness and extending from the bottom side of the block to the top side of the block.

The process for making a bracelet in accordance with the invention comprises inserting a strip of heat-shrinkable sheet material into a spiral slot in a silicone rubber mold, heating the strip while the strip is in the mold, thereby causing said strip to shrink, to become resilient, and to assume an arc-shaped configuration when relaxed, and removing the strip from the mold.

Preferably the spiral slot has a minimum radius not greater than 15 mm. and a maximum radius not greater than 25 mm. Ideally, the minimum radius of the spiral slot should be 15 mm, and its maximum radius should be 25 mm. The strip, in its arc-shaped configuration, can be expanded to receive an individual's wrist, and contracts by reason of its resilience to fit snugly but comfortably onto the individual's wrist.

BRIEF DESCRIPTION OF THE DRAWINGS

FIG. 3 is a perspective view illustrating the step of decorating a shrinkable strip in the process of making a bracelet using the mold;

FIG. 4 is a perspective view illustrating the insertion of the decorated strip into the mold;

FIG. 5 is a perspective view of the bracelet removed from the mold after heat treatment; and FIG. 6 is a perspective view showing the completed bracelet worn on an individual's wrist.

DETAILED DESCRIPTION OF THE PREFERRED EMBODIMENTS

Figure 1:
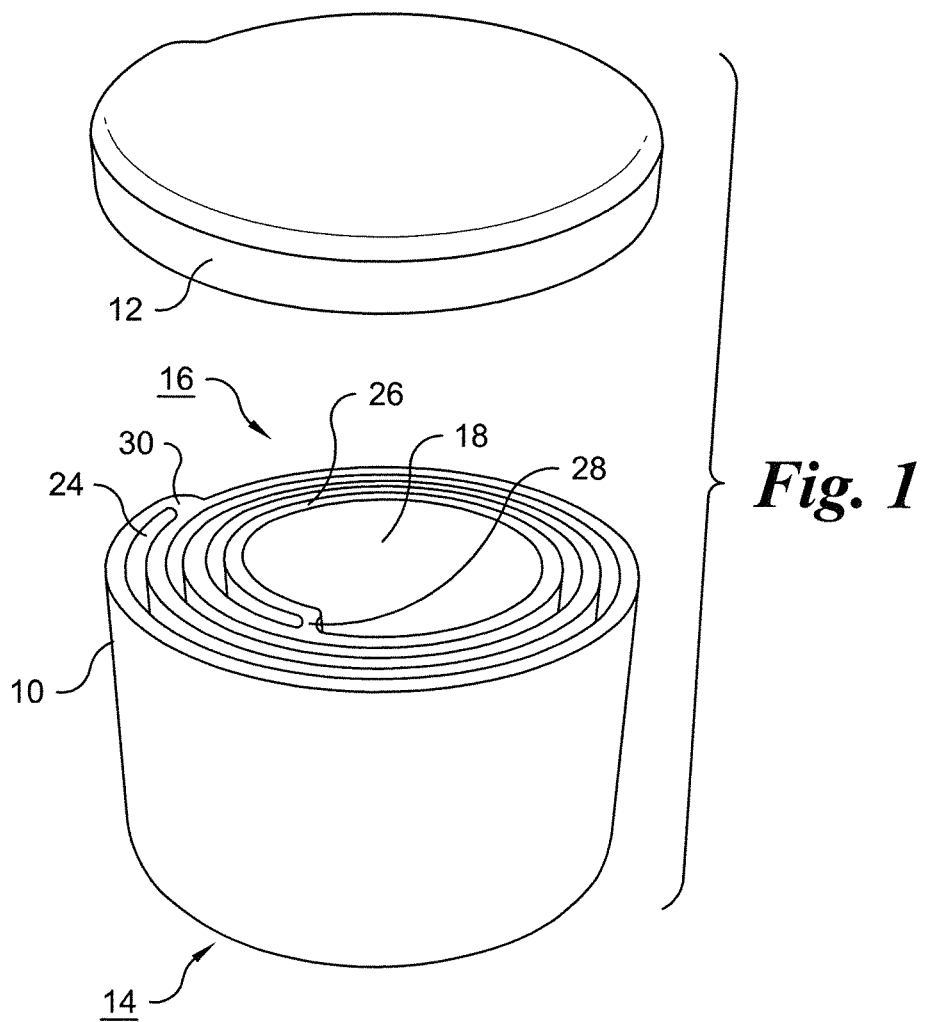
FIG. 1 is an exploded perspective view of a mold in accordance with the invention, consisting of a mold body and a cover.

A shown in FIG. 1, the mold comprises a mold body 10 and a removable cover 12, both composed of a silicone rubber. Most silicone rubbers will withstand typical household oven temperatures which can exceed 230° C. (446° F.), and high heat resistant silicone rubbers are available that will withstand considerably higher temperatures.

Figure 2:
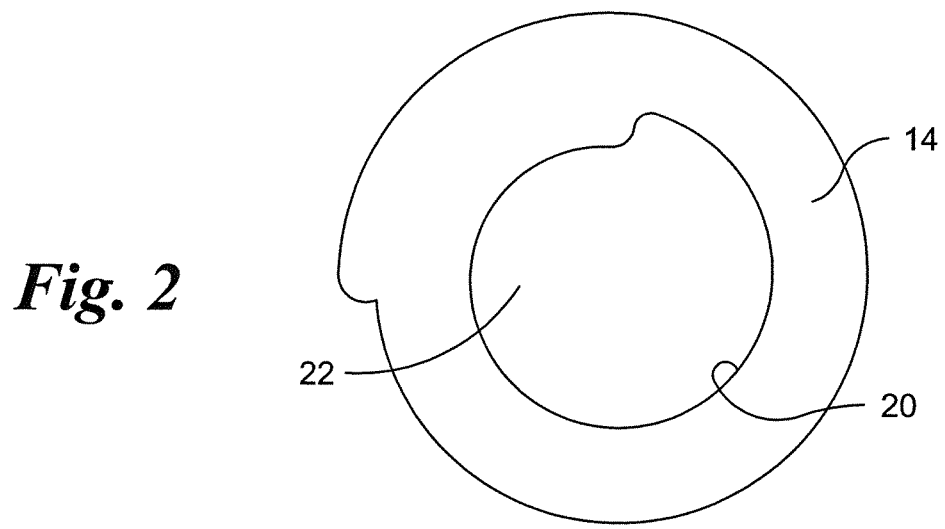
FIG. 2 is a bottom plan view of the mold body.

The mold body 10 is in the form of a block of silicone rubber having a flat bottom side 14 and a top side 16 in a plane parallel to the bottom side. The top side 16 has a central opening 18, and the bottom side 14 has a central opening 20, shown in FIG. 2. These openings 18 and 20 are connected to each other by a through passage 22 extending from the bottom side 14 to the top side 16.

As seen in FIG. 1, a spiral slot 24 is formed in the silicone rubber block 10. This slot is open at the top side of the block but closed at the bottom side. The slot has a uniform width, and extends at least two full turns) (720°)around a vertical axis, preferably extending through an angle of 810°, i.e., two and one quarter turns.

The term "spiral" as used herein refers to a curve defined by a point on a radial line that rotates about a center, where the distance along the radial line from the center to the point increases at a rate proportional to the angle between the radial line and a fixed reference radial line extending through the center. That is, a spiral is defined in polar coordinates as a continuous portion of a curve $r=k\theta$, where r is the distance from the center to the point, $\theta$ is the angle, and k is a constant.

As seen in FIG. 1, the spiral slot is bounded by a spiral wall 26 that extends from an inner face of the bottom side 14 of the block to the top side 16 of the block. The spiral wall 26 has a uniform thickness, preferably 2 mm. The inner and outer ends of the spiral slot are closed respectively by wall portions 28 and 30, each of which crosses the spiral slot and extends from an end of the spiral wall to an adjacent part of a next turn of the spiral wall.

The uniform thickness of the spiral wall 24, promotes uniform heating of a heat-shrinkable strip placed in the spiral slot. The central passage 22 makes it possible for the inner part of the spiral wall to have the same thickness as its other parts.

The cover 12 is shaped to fit over the top of the mold body 10, and has a flange 32, which extends downward and is shaped to fit the upper portion of the outer wall of the mold body closely.

The height of the mold body, i.e., the distance from the bottom side 14 to the top side 16, is preferably about 32 mm, and the vertical height of the spiral slot 24 is slightly less, e.g., 30 mm.

To make a bracelet, a user can first decorate a coated strip 34 of heat-shrinkable material as shown in FIG. 3, using an ink pen 36, brush or similar utensil. Alternatively various printing techniques can be used, such as printing using an ink-jet printer controlled by a computer program to generate a decorative pattern, or image.

The decorated strip, the length of which should be slightly less than the length of the spiral slot 24, e.g. about 250 mm, is placed into the spiral slot as shown in FIG. 4. The strip is typically transparent, and therefore the decorated side of the strip can face either toward the inside or toward the outside of the spiral. The cover 12 (FIG. 1) is then placed over the mold body 10, and the covered mold body, with the heat-shrinkable strip inside it, is placed in an oven (which can be a conventional oven or a toaster oven), preheated to a temperature of 177° C. (350° F.), and allowed to bake for 6-7 minutes. Upon removal, the strip will have shrunk to about one-half its original length, and will have assumed an arc-shaped as shown in FIG. 5. To produce a wrist bracelet suitable for wearing both by children and adults, the spiral slot should have a minimum radius not greater than 15 mm. and a maximum radius not greater than 25 mm. Ideally, the minimum radius of the spiral slot should be 15 mm its maximum radius should be 25 mm.

If the spiral slot in the mold has these minimum and maximum radii, the radius of the relaxed, arc-shaped strip shown in FIG. 5 will be in the range of about 17 to 25 mm, smaller than the average radius of a child's wrist, and the size of the gap 38 between the ends of the strip will be in the range of about 10 to 25 mm. The strip can be expanded to receive an individual's wrist, and, because of its resilience, it will contract to fit the individual's wrist snugly but comfortably, as shown in FIG. 6.

What is claimed is:

1. A process for making a bracelet, the process comprising:

inserting a strip of heat-shrinkable sheet material into a spiral slot in a mold along a direction of the width of said strip, the length of said strip being slightly less than the length of the spiral slot, said mold comprising a block of silicone rubber having a bottom side and a top side parallel to said bottom side with walls defining said spiral slot extending between the top and bottom sides, said spiral slot being formed in said block, the spiral slot being open at said top side and closed at said bottom side, and said spiral slot extending by at least two full turns around an axis in perpendicular relation to said top and bottom sides;

heating said strip while said strip is in said mold, thereby causing said strip to shrink and become resilient; and removing said strip from said mold, said removed strip having an arc-shaped configuration as a result of said heating, whereby said strip, in said arc-shaped configuration, can be expanded to receive an individual's wrist and then contracts by reason of its resilience to fit snugly onto said individual's wrist.

2. The process according to claim 1, in which said spiral slot has a minimum radius not greater than 15 mm.

3. The process according to claim 1, in which said spiral slot has a maximum radius not greater than 25 mm.

4. The process according to claim 1, in which said spiral slot has a minimum radius not greater than 15 mm and a maximum radius not greater than 25 mm.

5. The process according to claim 1, in which said spiral slot has a minimum radius of 15 mm.

6. The process according to claim 1 in which said spiral slot has a maximum radius of 25 mm.

7. The process according to claim 1, in which said spiral slot has a minimum radius of 15 mm and a maximum radius of 25 mm.

8. The process according to claim 1, in which said mold also comprises a cover that fits removably over the top side of said block for enclosing the spiral slot, wherein said cover is fitted over the top side of the block during the heating of the strip in said mold.

9. The process according to claim 8, in which said cover is composed of silicone rubber.

10. The process according to claim 1, in which said slot extends around said axis through an angle of 810°.

11. The process according to claim 1, in which each of said bottom and top sides has a central opening, the central opening in the bottom side is connected to the central opening in the top side by a through passage, an innermost portion of said walls defines said central opening, and said walls have a uniform thickness.

* * * * *